(12) United States Patent
Endo

(10) Patent No.: US 7,585,242 B2
(45) Date of Patent: Sep. 8, 2009

(54) CONTROL DEVICE OF VEHICULAR AUTOMATIC TRANSMISSION

(75) Inventor: Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 408 days.

(21) Appl. No.: 11/653,837

(22) Filed: Jan. 17, 2007

(65) Prior Publication Data
US 2007/0179004 A1 Aug. 2, 2007

(30) Foreign Application Priority Data
Jan. 31, 2006 (JP) ............................ 2006-023633

(51) Int. Cl.
*F16H 31/00* (2006.01)
(52) U.S. Cl. ....................................... 475/117
(58) Field of Classification Search ................. 475/117
See application file for complete search history.

(56) References Cited

U.S. PATENT DOCUMENTS

| 4,905,545 A | | 3/1990 | Leising et al. | |
|---|---|---|---|---|
| 4,928,227 A | | 5/1990 | Burba et al. | |
| 5,928,108 A | * | 7/1999 | Takiguchi | 477/98 |
| 6,039,674 A | * | 3/2000 | Dourra et al. | 477/166 |
| 6,093,133 A | * | 7/2000 | Danielsen et al. | 477/117 |
| 6,579,207 B2 | * | 6/2003 | Horiguchi | 477/98 |
| 6,616,561 B2 | * | 9/2003 | Futamura | 475/123 |
| 6,814,689 B2 | * | 11/2004 | Horiguchi | 477/161 |
| 2002/0107109 A1 | | 8/2002 | Horiguchi | |
| 2003/0104893 A1 | | 6/2003 | Horiguchi | |

FOREIGN PATENT DOCUMENTS

| DE | 197 55 064 A1 | 9/1998 |
|---|---|---|
| JP | A 02-150561 | 6/1990 |
| JP | A 2002-213595 | 7/2002 |
| JP | A 2002-227982 | 8/2002 |

* cited by examiner

*Primary Examiner*—Dirk Wright
(74) *Attorney, Agent, or Firm*—Oliff & Berridge, PLC

(57) ABSTRACT

In relation to an automatic transmission which has a plurality of friction engagement devices that are engaged when supplied with oil pressure and which establishes a plurality of speed change steps in accordance with engaged and released states of the friction engagement devices, a control device of a vehicular automatic transmission that switches between the speed change steps in accordance with a predetermined shift rule includes a controller which changes the shift rule to an air discharge-purpose shift rule that is set so as to provide a higher probability of switching to a speed change step that involves engagement of a predetermined friction engagement device of the friction engagement devices than the shift rule in order to discharge air that has intruded in a hydraulic circuit of the predetermined friction engagement device, and which causes switching between the speed change steps in accordance with the air discharge-purpose shift rule.

6 Claims, 10 Drawing Sheets

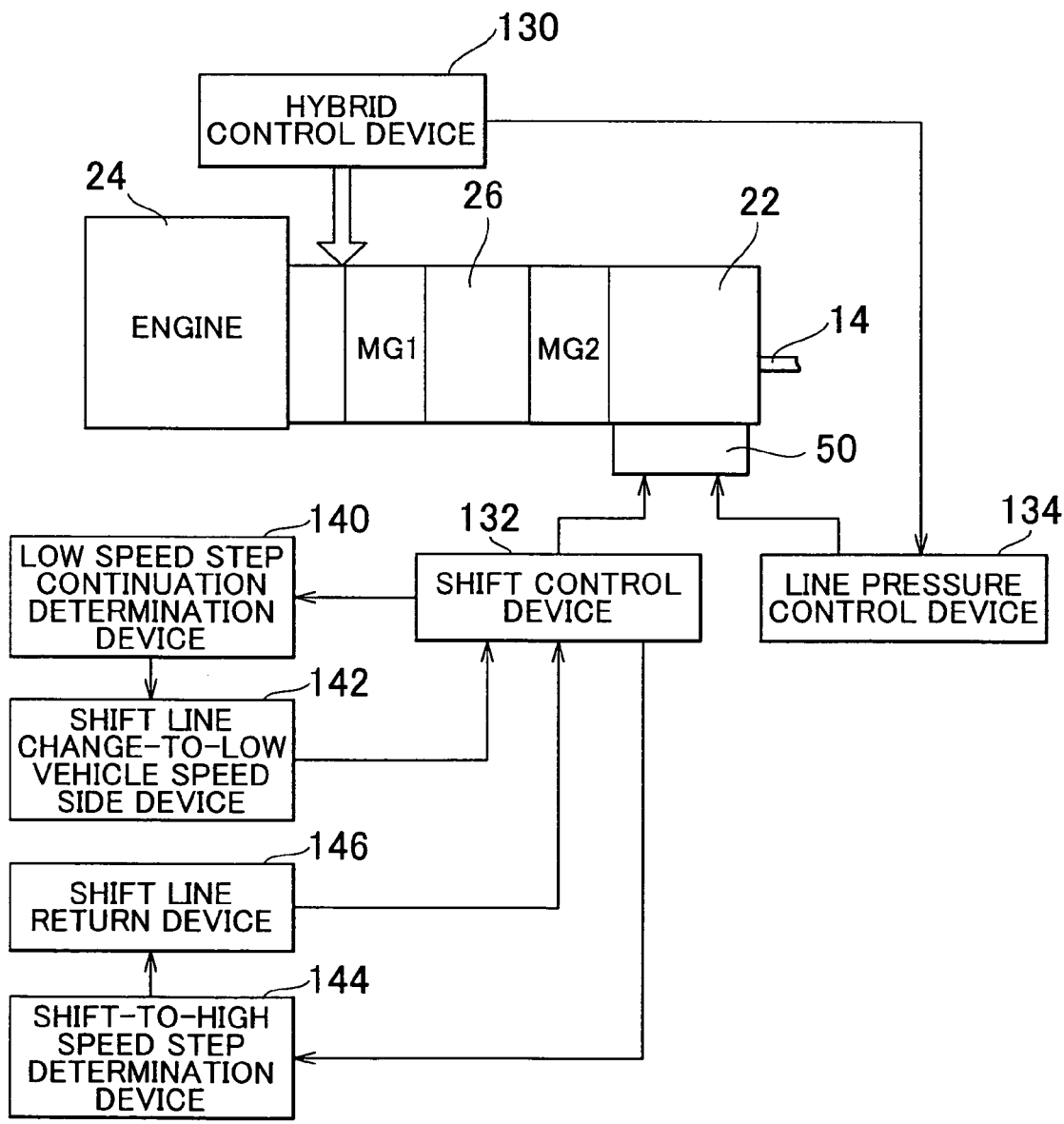

CONTROL DEVICE OF VEHICULAR AUTOMATIC TRANSMISSION

INCORPORATION BY REFERENCE

The disclosure of Japanese Patent Applications No. 2006-023633 filed on Jan. 31, 2006, including the specification, drawings and abstract is incorporated herein by reference in its entirety.

BACKGROUND OF THE INVENTION

1. Field of the Invention

The invention relates to a control device of an vehicular automatic transmission and, more particularly, to an improvement in the technology of discharging air that has intruded in a hydraulic circuit of a friction engagement device.

2. Description of the Related Art

In a vehicular automatic transmission which has a plurality of friction engagement devices that are engaged when supplied with oil pressure and which establishes a plurality of speed change steps in accordance with the engaged and released states of the friction engagement devices, air intrudes into a hydraulic circuit of a friction engagement device that is put into the released state during a run of the vehicle, as the working oil is agitated by vibrations of the vehicle or the like. Therefore, if the traveling time with the engagement device being in the released state becomes long, the accumulation of air changes the characteristic of oil pressure change at the time of engagement (response or the like) so that the shift controllability at the time of the shift that involves the engagement of the aforementioned friction engagement device deteriorates and therefore a shift shock (a drive force change or the like due to racing-up, tied-up, etc.) may occur.

Automatic transmissions that include air discharge means for automatically discharging the air that has intruded into the hydraulic circuit of a friction engagement device as described above (air bleeding) are described, for example, in Japanese Patent Application Publication No. JP-A-2002-213595 and No. JP-A-2002-227982. In any one of such automatic transmissions, when the automatic transmission is in the first speed state immediately following the initial N→D shift switch during a state of the vehicle driving where an ignition switch has just been turned on, oil pressure is supplied to the friction engagement device that is released in the first speed so that the air that has intruded in the hydraulic circuit is discharged by the oil pressure. Besides, in Japanese Patent Application Publication No. JP-A-2002-213595, the time of execution of an air discharging process is set in accordance with the working oil temperature so as to make the air discharging process time as short as possible and therefore limit its effect on the shift control. In Japanese Patent Application Publication No. JP-A-2002-227982, the line pressure is increased for a predetermined time from the start of the air discharging process so that the air discharge is efficiently performed.

However, in the case where during the state of the first speed in the D range, oil pressure is supplied to the friction engagement device that is released in the first speed in order to perform the air discharging process, if accelerator operation is performed during that process, the response at the time of launching the vehicle can be impaired due to the need to drain the oil pressure of the friction engagement device, or drag can occur in that friction engagement device due to the transmission of power prior to the complete release of the friction engagement device.

SUMMARY OF THE INVENTION

In view of the aforementioned problems, a control device of a vehicular automatic transmission that makes it possible to discharge air that has intruded in a hydraulic circuit without impairing the response to a vehicle-driving operation nor causing occurrence of drag in a friction engagement device.

Accordingly, in relation to an automatic transmission which has a plurality of friction engagement devices that are engaged when supplied with an oil pressure and which establishes a plurality of speed change steps in accordance with an engaged state and a released state of the plurality of friction engagement devices, there is provided a control device of a vehicular automatic transmission that switches between the speed change steps in accordance with a predetermined shift rule. The control device includes a controller which changes the shift rule to an air discharge-purpose shift rule that is set so as to provide a higher probability of switching to a speed change step that involves engagement of a predetermined friction engagement device of the plurality of friction engagement devices than the shift rule in order to discharge air that has intruded in a hydraulic circuit of the predetermined friction engagement device, and which causes switching between the speed change steps in accordance with the air discharge-purpose shift rule.

In the control device of the vehicular automatic transmission described above, as the shift rule for the switching between speed change steps is changed to the air discharge-purpose shift rule, the probability of switching to the speed change step that involves the engagement of a predetermined friction engagement device from which air needs to be discharged becomes relatively high. Therefore, when a judgment for the switch to the speed change step is made and oil pressure is supplied to engage the predetermined friction engagement device, air in the hydraulic circuit of the predetermined friction engagement device is discharged. Due to this, when the speed change step is switched in accordance with the ordinary shift rule afterward, that is, when oil pressure is supplied to the predetermined friction engagement device to engage it, there is no risk of impairment of the shift controllability being caused by intrusion of air.

Furthermore, since the air discharge is performed by increasing the likelihood of the engagement of the predetermined friction engagement device by changing the shift rule to the air discharge-purpose shift rule, the air discharge will be performed during the shift action while the vehicle is in an ordinary running state. Therefore, there is no risk of impairment of the response to a vehicle-driving operation or occurrence of drag in the friction engagement device, unlike, for example, the case where the air discharging process is performed immediately following the N→D shift switch during an initial period of the vehicle-driving operation.

According to another aspect of the invention, in relation to an automatic transmission which has a plurality of friction engagement devices that are engaged when supplied with an oil pressure and which establishes a first speed change step by engaging a first friction engagement device of the plurality of friction engagement devices and releasing a second friction engagement device of the plurality of friction engagement devices, and establishes a second speed change step by releasing the first friction engagement device and engaging the second friction engagement device, there is provided a control device of a vehicular automatic transmission that switches between the first speed change step and the second speed change step in accordance with a predetermined shift rule. This control device includes a controller which changes the shift rule to an air discharge-purpose shift rule that is set so as to provide a higher probability of switching to the first speed change step than the shift rule in order to discharge air that has intruded in a hydraulic circuit of the first friction engagement device, and which causes switching between the speed change steps in accordance with the air discharge-purpose shift rule.

According to the control device of the vehicular automatic transmission described above, the first friction engagement device that is engaged to establish the first speed change step corresponds to the predetermined friction engagement device in the first aspect of the invention. As the shift rule (ordinary shift rule) is changed to the air discharge-purpose shift rule, the probability of switching to the first speed change step becomes relatively high. Therefore, when a judgment for the switch to the first speed change step is made and oil pressure is supplied to engage the first friction engagement device, air in the hydraulic circuit of the first friction engagement device is discharged. Due to this, when the speed change step is switched to the first speed change step in accordance with the ordinary shift rule afterward, that is, when oil pressure is supplied to the first friction engagement device to engage it, there is no risk of impairment of the shift controllability being caused by intrusion of air. Furthermore, since the air discharge from the first friction engagement device is performed by increasing the likelihood of the switch to the first speed change step by changing the shift rule to the air discharge-purpose shift rule, the air discharge will be performed during the shift action while the vehicle is in an ordinary running state. Therefore, there is no risk of impairment of the response to a vehicle-driving operation or occurrence of drag in the friction engagement device, unlike, for example, the case where the air discharging process is performed immediately following the N→D shift switch during an initial period of the vehicle-driving operation.

According to another aspect of the invention, there is provided a control device of a vehicular automatic transmission which has an electric oil pump that generates oil pressure, and a plurality of friction engagement devices that are engaged when supplied with the oil pressure, and which establishes a plurality of speed change steps in accordance with an engaged state and a released state of the plurality of friction engagement devices. This control device includes a vehicle driving end determination device that determines that an ending operation of ending a driving of a vehicle has been performed; and an air discharge device that discharges air that has intruded in a hydraulic circuit of a predetermined friction engagement device of the plurality of friction engagement devices by driving the electric oil pump so as to supply oil pressure to the predetermined friction engagement device, if it is determined by the vehicle driving end determination device that the ending operation has been performed.

According to the control device of the vehicular automatic transmission described above, when it is determined that the ending operation of ending the driving of the vehicle has been performed, the electric oil pump is driven to supply oil pressure to the predetermined friction engagement device, so that the air that has intruded in the hydraulic circuit of the predetermined friction engagement device is discharged. Therefore, when the predetermined friction engagement device is to be engaged after the driving of the vehicle is started again, there is no risk of the shift controllability being impaired by intrusion of air. Furthermore, since the air discharging process is performed after the vehicle driving ending operation is performed, there is ordinarily no risk of overlap between the air discharging process and the vehicle-driving operation. Therefore, there is no risk of deterioration of the response to a driving operation, or occurrence of drag in the friction engagement device, unlike, for example, the case where the air discharging process is performed immediately following the N→D shift switch during an initial period of the driving operation.

As the aforementioned automatic transmission, a stepped automatic transmission, for example, of a planetary gear type, a parallel-axes type, etc., may suitably be used. Besides, in a clutch-to-clutch shift in which the shift is performed by releasing one friction engagement device while engaging another friction engagement device, fine hydraulic control is required, and therefore the shift control is considerably impaired by the intrusion of air. Thus, the invention is suitably applied to the clutch-to-clutch shift. In the case where the shift is performed merely by engaging one friction engagement device due to the presence of a one-way clutch or the like, too, the intrusion of air deteriorates the shift response. Therefore, the application of the invention to this case also prevents the deterioration of the response.

Torque is input to the automatic transmission from a drive source such as an engine, an electric motor, etc. The friction engagement devices are belt-type brakes, single-plate or multi-plate clutches or brakes that are engaged by hydraulic actuators such as hydraulic cylinders and the like, etc.

As for the shift rule (ordinary shift rule) and the air discharge-purpose shift rule, shift lines (shift maps or the like) determined by using as a parameter the vehicle run state, for example, the vehicle speed, the requested drive force, etc., are suitably used. However, various fashions are possible; for example, the shift rule and the air discharge-purpose shift rule may be rules that determine the speed change step through the use of a computing expression such as a fuzzy inference or the like.

The friction engagement device that needs air discharge is, for example, a friction engagement device that is engaged only in a high-speed speed change step that is selected during a high-speed run on an expressway or the like, in accordance with the ordinary shift rule. The air discharge-purpose shift rule used for the friction engagement device in need of air discharge is determined so as to cause the switch to the high-speed speed change step in a lower vehicle speed side than the ordinary shift rule so that the switch to the high-speed speed change step will be performed even during an intermediate-speed run on an ordinary road.

As for the air discharge-purpose shift rule, a constant rule may be determined beforehand on the basis of the ordinary shift rule and a common form of run of the vehicle. The driving preference (tendency) of each driver may be determined, and an air discharge-purpose shift rule may be set such that the switch to the speed change step that involves the engagement of a predetermined friction engagement device becomes likely to occur on the basis of the driving preference.

The air discharge-purpose shift rule may be set completely separately from the ordinary shift rule by using a different parameter or the like. However, the air discharge-purpose shift rule may be a rule set by correcting the ordinary shift rule in accordance with a predetermined correction rule (a computing expression or the like), for example, dislocating the shift line to a low speed side by a predetermined vehicle speed, or the like. The shift line of the air discharge-purpose shift rule may also be a line obtained by correcting the shift line of the ordinary shift rule in accordance with a predetermined correction rule.

The automatic transmission may be, for example, a transmission with only two forward-travel speed change steps, that is, the first speed change step on the high speed side and the second speed change step on the low speed side. In that case, the ordinary shift rule is determined so that the switch from the second speed change step to the first speed change step is performed at high vehicle speed of, for example, about 80 to 90 km/h. The air discharge-purpose shift rule is determined so that the switch from the second speed change step to the first speed change step is performed at intermediate speed of, for example, about 40 to 50 km/h.

As for the air discharge, it is suitable that the execution of the air discharge be permitted due to the change from the shift rule to the air discharge-purpose shift rule being made if the continuation time during which the second speed change step has been established becomes equal to or greater than a predetermined value. As for the measurement of the continuation time, the continuation time of the second speed change step may be measured, for example, during the period from the start of driving of the vehicle until the driving ending operation is performed. However, in order to prevent the deterioration of the shift controllability due to air intrusion and, at the same time, limit the implementation of the air discharging process to a required minimum frequency, it is desirable that the continuation time of the second speed change step be stored even after the electric power source is turned off following the ending operation of the driving, and that when the driving is started again, the continuation time stored be carried on for the measurement.

The predetermined value for the determination regarding the continuation time may be appropriately set at a value, for example, about several hours to several ten hours, in accordance with the likelihood of intrusion of air that is different depending on the hydraulic circuits and the working oil. Furthermore, the predetermined value may be a constant value, or can instead be set by using, as a parameter, the temperature of the working oil, the air pressure (altitude or the like), etc. that affect the air intrusion.

For the permission of the execution of the air intrusion, an execution permission condition other than the continuation time may also be set, for example, a condition that the vehicle be in a steady run where the vehicle run state (the accelerator operation amount, the vehicle speed, etc.) is substantially constant, or the like. Various other execution permission conditions may be set in consideration of the engagement condition, the hydraulic characteristic, etc. of a friction engagement device that needs air discharge. For example, the execution may also be permitted in the case where the traveling time of the vehicle becomes greater than or equal to a predetermined value, or in the case where the traveling distance has become greater than or equal to a predetermined value, or the like. Furthermore, the invention is also applicable to automatic transmissions that have three or more forward-travel speed change steps.

Furthermore, in the control device of the vehicular automatic transmission, in the case where the shift rule has been changed to the air discharge-purpose shift rule and the speed change step has been actually switched with the predetermined friction engagement device engaged, it is desirable to immediately return to the ordinary shift rule in order to limit the deterioration in the running performance, the fuel economy, etc., associated with the change of the shift rule, to a minimum level. To this end, it is desirable that the controller be able to make determination regarding the actual switching of the speed change step and to return to the previous shift rule on the basis of the result of the determination.

The ending operation of the driving is the final operation in ending the driving of the vehicle, for example, the turning-off operation of a main switch (the ignition switch, the power switch, or the like) for stopping the control system of the vehicle, or the like. The possibility of an operation of starting the driving again (the turning-on operation of the main switch) being performed immediately after the driving ending operation is low. Therefore, there is almost no possibility of the operation of re-starting the driving being performed during the air discharging process, which ends in, for example, a few seconds (about 1 to 3 seconds). If the re-starting operation of the driving should be performed during the air discharging process, there is no risk of impairment of the launching performance since before the accelerator is operated to launch the vehicle, it is necessary to perform a parking brake releasing operation, and a shift lever operation, etc. However, in the case where the re-starting operation of the driving is performed during the air discharging process, there is a need to restrict the action of the drive source until the air discharging process ends, in order to avoid the generation of drive force due to the engagement of the friction engagement device for discharging air. For example, it is suitable to provide a system activation prohibition device that prohibits the activation of the control system, or the like by, for example, canceling the re-starting operation of the driving.

Even in the case where the ending operation is performed, the control system is not immediately stopped. Instead, after the air discharging process is performed by actuating the electric oil pump or switching the hydraulic circuit, the control system is completely stopped. In other words, among the processes related to the ending process control of stopping the actions of various portions in association with the ending operation, the ending processes of devices that are not needed for the air discharging process, such as a process of stopping the drive source, such as the engine, the electric motor, or the like, can be performed similarly to the related art.

Incidentally, it is possible to supply oil pressure to all the friction engagement devices of the automatic transmission so as to discharge air from all the respective hydraulic circuits. However, since this takes time, it is desirable to perform the air discharging process by supplying oil pressure only to the friction engagement device that needs air discharge.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 7 is an operation table showing speed change steps of the automatic transmission shown in FIG. 1, and the states of operation of linear solenoid valves and brakes for establishing the speed change steps;

FIG. 8 is a block diagram illustrating various functions of electronic control devices in the hybrid drive device of FIG. 1 on the basis of the first embodiment;

DETAILED DESCRIPTION OF THE PREFERRED EMBODIMENTS

In the following description and the accompanying drawings, the present invention will be described in more detail with reference to exemplary embodiments.

Figure 1:
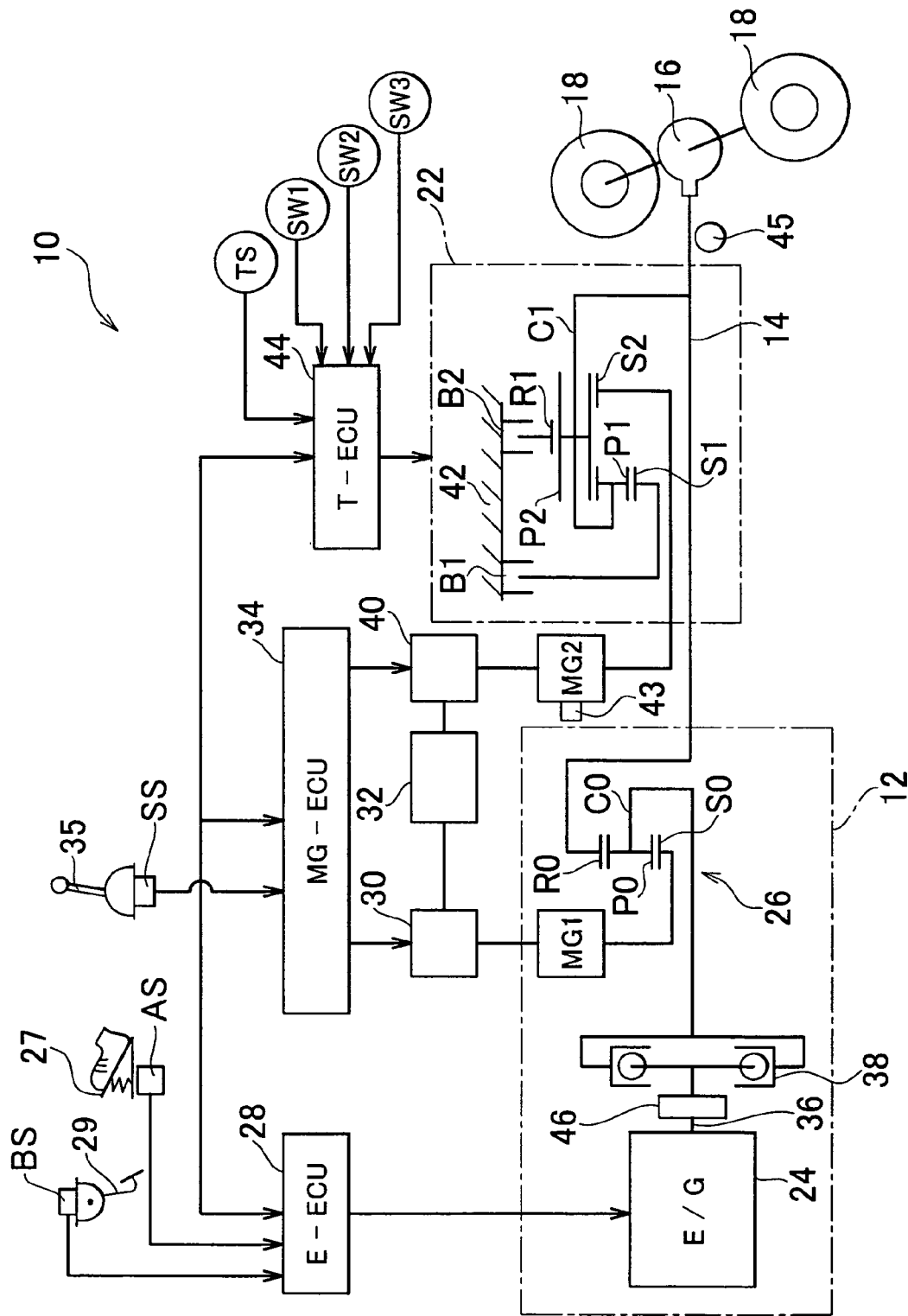
FIG. 1 is a diagram illustrating an overall construction of a hybrid drive device to which first and second embodiments as examples of the invention are applied.

FIG. 1 is a schematic construction diagram illustrating a hybrid drive device 10 to which a first embodiment of the invention is applied. Referring to FIG. 1, in the hybrid drive device 10, torque of a first drive source 12 that is a main drive source is transmitted to an output shaft 14 that functions as an output member, and the torque is transmitted from the output shaft 14 to a pair of left and right driving wheels 18 via a differential gear device 16 in a vehicle. Besides, in the hybrid drive device 10, a second motor-generator MG2 capable of selectively executing a power running control of outputting the drive force for running the vehicle and a regenerative control for recovering energy is provided as a second drive source. The second motor-generator MG2 is linked to the output shaft 14 via an automatic transmission 22. Therefore, the capacity of torque transmitted from the second motor-generator MG2 to the output shaft 14 is increased or decreased in accordance with the speed change ratio γs (=the rotation speed MG2 of the MG2/the rotation speed $N_{OUT}$ of the output shaft 14) that is set by the automatic transmission 22.

The automatic transmission 22 is constructed so as to be able to establish a plurality of steps whose speed change ratios γs is larger than "1". Therefore, at the time of power running when torque is output from the second motor-generator MG2, the torque can be increased by the automatic transmission 22 while being transmitted to the output shaft 14. Hence, the second motor-generator MG2 is constructed with a further reduced capacity or in a further reduced size. Due to this, for example, in the case where the rotation speed $N_{OUT}$ of the output shaft 14 becomes high in association with high vehicle speed, the speed change ratio γs is made small to drop the rotation speed NMG2 of the second motor-generator MG2, in order to maintain a good state of the operation efficiency of the second motor-generator MG2. In the case where the rotation speed $N_{OUT}$ of the output shaft 14 drops, the speed change ratio γs is made large to increase the rotation speed NMG2 of the second motor-generator MG2.

As for the shifting of the automatic transmission 22, the torque capacity of the automatic transmission 22 drops or inertial torque associated with change in the rotation speed occurs, in which case the torque of the output shaft 14, that is, the output shaft torque, is affected. Therefore, in the hybrid drive device 10, on the occasion of shifting by the automatic transmission 22, a control is performed such that the torque of the first drive source 12 is corrected so as to prevent or restrain the torque fluctuation of the output shaft 14.

The first drive source 12 is constructed mainly of an engine 24, a first motor-generator MG1, and a planetary gear device 26 for combining or distributing torque between the engine 24 and the first motor-generator MG1. The engine 24 is a publicly known internal combustion engine that outputs power by burning fuel, such as a gasoline engine, a diesel engine, etc. The engine 24 is constructed so that states of operation thereof, such as a the throttle valve opening degree, the intake air amount, the fuel supply amount, the ignition timing, etc., are electrically controlled by an engine-controlling electronic control device (E-ECU) 28 that is made up mainly of a microcomputer. The electronic control device 28 is supplied with detection signals from an accelerator operation amount sensor AS that detects the operation amount θacc of an accelerator pedal 27, a brake sensor BS for detecting the presence/absence of operation of a brake pedal 29, etc.

The first motor-generator MG1 is, for example, a synchronous electric motor, and is constructed to selectively perform the function as an electric motor of generating drive torque and the function as an electric power generator. The first motor-generator MG1 is connected to an electricity storage device 32, such as a battery, a capacitor, etc., via an inverter 30. Then, the inverter 30 is controlled by a motor-generator-controlling electronic control device (MG-ECU) 34 made up mainly of a microcomputer so that the output torque of the first motor-generator MG1 or the regenerative torque is adjusted or set. The electronic control device 34 is supplied with detection signals from an operation position sensor SS that detects the operation position of a shift lever 35, and the like.

The planetary gear device 26 is a single-pinion type planetary gear mechanism that includes three rotating elements: a sun gear S0, a ring gear R0 disposed concentrically with the sun gear S0, and a carrier C0 that supports pinions P0 meshing with the sun gear S0 and the ring gear R0, in such a manner that the pinions P0 are rotatable about their own axes and also revolvable. The planetary gear device 26 causes known differential effect, The planetary gear device 26 is provided concentrically with the engine 24 and the automatic transmission 22. Since the planetary gear device 26 and the automatic transmission 22 are constructed substantially symmetrically about a center line, the half portions thereof below the center line are omitted in FIG. 1.

In the first embodiment, a crankshaft 36 of the engine 24 is linked to the carrier C0 of the planetary gear device 26 via a damper 38. The sun gear S0 is linked to the first motor-generator MG1, and the output shaft 14 is linked to the ring gear R0. The carrier C0 functions as an input element, and the sun gear S0 functions as a reaction force element, and the ring gear R0 functions as an output element.

Figure 2:
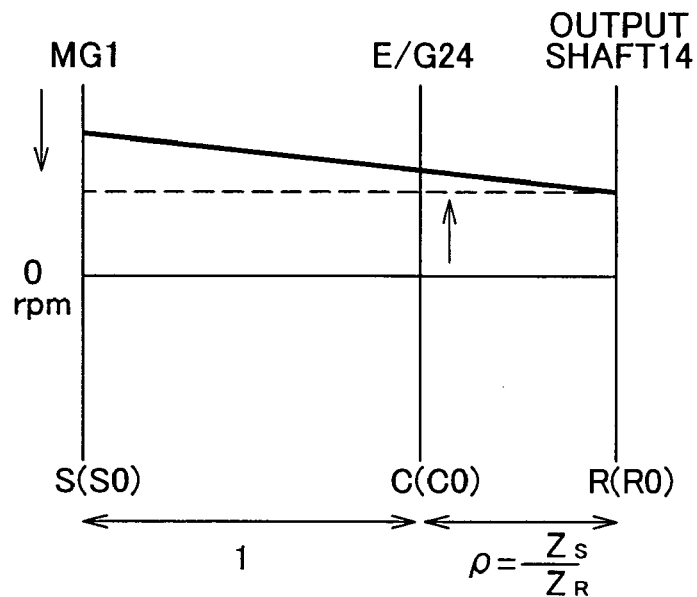
FIG. 2 is an alignment chart illustrating operations of a planetary gear device provided in a first drive source in the hybrid drive device of FIG. 1.

Relative relationships among the rotating elements of the single-pinion type planetary gear device 26 that functions as a torque combining-distributing mechanism are shown by an alignment chart in FIG. 2. In the alignment chart, a vertical axis S, a vertical axis C and a vertical axis R represent the rotation speed of the sun gear S0, the rotation speed of the carrier C0, and the rotation speed of the ring gear R0, respectively. The intervals between the vertical axis S, the vertical axis C and the vertical axis R are set so that when the interval between the vertical axis S and the vertical axis C is 1, the interval between the vertical axis C and the vertical axis R becomes ρ (the number of teeth $Z_S$ of the sun gear S0/the number of teeth $Z_R$ of the ring gear R0).

In the planetary gear device 26, when a reaction torque from the first motor-generator MG1 is input to the sun gear S0 while the output torque of engine 24 is input to the carrier C0, a torque greater than the torque input from the engine 24 appears on the ring gear R0 that is the output element, so that the first motor-generator MG1 functions as an electric power generator. While the rotation speed of the ring gear R0 (output shaft rotation speed) $N_{OUT}$ is constant, the rotation speed NE of the engine 24 can be continuously (steplessly) changed by changing the rotation speed NMG1 of the first motor-generator MG1 upward or downward. The dashed line in FIG. 2 shows a state where the rotation speed NE of the engine 24 drops when the rotation speed NMG1 of the MG1 is lowered from the value shown by a solid line. That is, a control of setting the rotation speed NE of the engine 24 at, for example, a rotation speed that provides the best fuel economy, can be executed by controlling the first motor-generator MG1. This type of hybrid system is termed mechanical distribution system or split type.

Referring back to FIG. 1, the automatic transmission 22 of the first embodiment is constructed of one set of a Ravigneaux type planetary gear mechanism. Specifically, in the automatic transmission 22, a first sun gear S1 and a second sun gear S2 are provided, and short pinions P1 mesh with the first sun gear S1. The short pinions P1 also mesh with long pinions P2 whose axial length is longer than that of the short pinions P1. The long pinions P2 mesh with a ring gear R1 that is disposed concentrically with the sun gears S1, S2. The pinions P1, P2 are supported by a common carrier C1 so as to be rotatable about their own axes and also revolvable. Besides, the second sun gear S2 meshes with the long pinions P2.

The second motor-generator MG2 is controlled by the motor-generator-controlling electronic control device (MG-ECU) 34 via an inverter 40 so as to function as the electric motor or the electric power generator so that the assist-purpose output torque or the regenerative torque is adjusted or set. The second motor-generator MG2 is linked to the second sun gear S2, and the carrier C1 is linked to the output shaft 14. The first sun gear S1 and the ring gear R1, together with the pinions P1, P2, construct a mechanism that corresponds to a double-pinion type planetary gear device. The second sun gear S2 and the ring gear R1, together with the long pinions P2, construct a mechanism that corresponds to a single-pinion type planetary gear device.

The automatic transmission 22 is also provided with a first brake B1 that is provided between the first sun gear S1 and a transmission housing 42 for selectively fixing the first sun gear S1, and a second brake B2 that is provided between the ring gear R1 and the transmission housing 42 for selectively fixing the ring gear R1. These brakes B1, B2 are so-called friction engagement devices that produce engagement force by friction force. As the brakes, it is possible to adopt multi-plate type engagement devices or band-type engagement devices. Then, each of the brakes B1, B2 is constructed so that the torque capacity thereof continuously changes in accordance with the engagement pressure that is generated by a hydraulic actuator such as a hydraulic cylinder or the like.

In the automatic transmission 22 constructed as described above, when the second sun gear S2 functions as an input element and the carrier C1 functions as an output element and the first brake B1 is engaged, a high speed step H whose speed change ratio γsh is greater than "1" is established. If the second brake B2 is engaged instead of the first brake B1 in a similar situation, a low speed step L whose speed change ratio γsl is greater than the speed change ratio γsh of the high speed step H is established. That is, the automatic transmission 22 is a two-speed change step transmission, and the shifting between the speed change steps H and L is executed on the basis of states of run of the vehicle such as the vehicle speed V, the required drive force (or the accelerator operation amount θacc), etc. More concretely, speed change step regions are determined beforehand as a map (shift chart), and a control is performed such as to set either one of the speed change steps in accordance with the detected vehicle driving state. A shift-controlling electronic control device (T-ECU) 44 made up mainly of a microcomputer for performing the control is provided.

The electronic control device 44 is supplied with detection signals from an oil temperature sensor TS for detecting the temperature $T_{OIL}$ of the working oil, a hydraulic switch SW1 for detecting the engagement oil pressure of the first brake B1, a hydraulic switch SW2 for detecting the engagement oil pressure of the second brake B2, a hydraulic switch SW3 for detecting the line pressure PL, etc. Besides, a second MG2 rotation speed sensor 43 that detects the rotation speed NMG2 of the second motor-generator MG2, and an output shaft rotation speed sensor 45 that detects the rotation speed $N_{OUT}$ of the output shaft 14 corresponding to the vehicle speed V also supply signals that represent the rotation speeds to the electronic control device 44.

Figure 3:
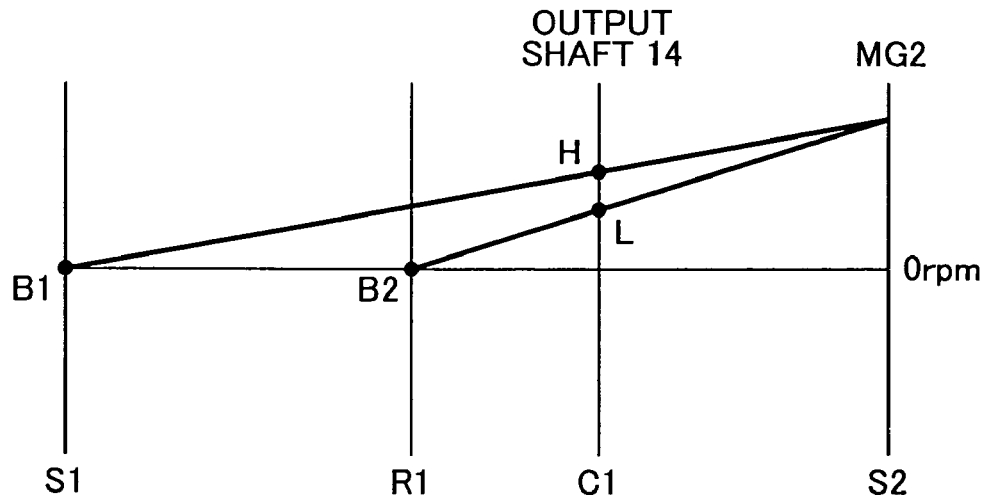
FIG. 3 is an alignment chart illustrating a plurality of speed change steps of an automatic transmission provided between a second motor-generator and an output shaft in the hybrid drive device of FIG. 1.

FIG. 3 shows an alignment chart that has four vertical axes, that is, a vertical axis S1, a vertical axis R1, a vertical axis C1, and a vertical axis S2, in order to represent relative relationships between the rotating elements of the Ravigneaux type planetary gear mechanism that constitutes the automatic transmission 22. The vertical axis S1, the vertical axis R1, the vertical axis C1 and the vertical axis S2 show the rotation speed of the first sun gear S1, the rotation speed of the ring gear R1, the rotation speed of the carrier C1, and the rotation speed of the second sun gear S2, respectively.

In the automatic transmission 22 constructed as described above, when the ring gear R1 is fixed by the second brake B2, the low speed step L is set, and the assist torque the second motor-generator MG2 outputs is amplified in accordance with the corresponding speed change ratio γsl, and is thus applied to the output shaft 14. On the other hand, when the first sun gear S1 is fixed by the first brake B1, the high speed step H having the speed change ratio γsh that is smaller than the speed change ratio γhl of the low speed step L is set. Since the speed change ratio of the high speed step H is also larger than "1", the assist torque that the second motor-generator MG2 outputs is amplified in accordance with the speed change ratio γsh, and is applied to the output shaft 14.

Incidentally, although the torque applied to the output shaft 14 during a state where one of the speed change steps L, H is steadily set is a torque obtained by increasing the output torque of the second motor-generator MG2 in accordance with the corresponding speed change ratio, the torque during a shift transitional state of the automatic transmission 22 is a torque that is affected by the torque capacity at the brake B1 or B2, the inertia torque associated with the rotation speed change, etc. Besides, the torque applied to the output shaft 14 becomes positive torque during a driving state of the second motor-generator MG2, and becomes negative torque during a driven state of the second-motor generator MG2. The driven state of the second motor-generator MG2 is a state where the second motor-generator MG2 is rotationally driven as rotation of the output shaft 14 is transmitted to the second motor-generator MG2 via the automatic transmission 22, and does not necessarily accord with the driving or the being driven of the vehicle.

Figure 4:
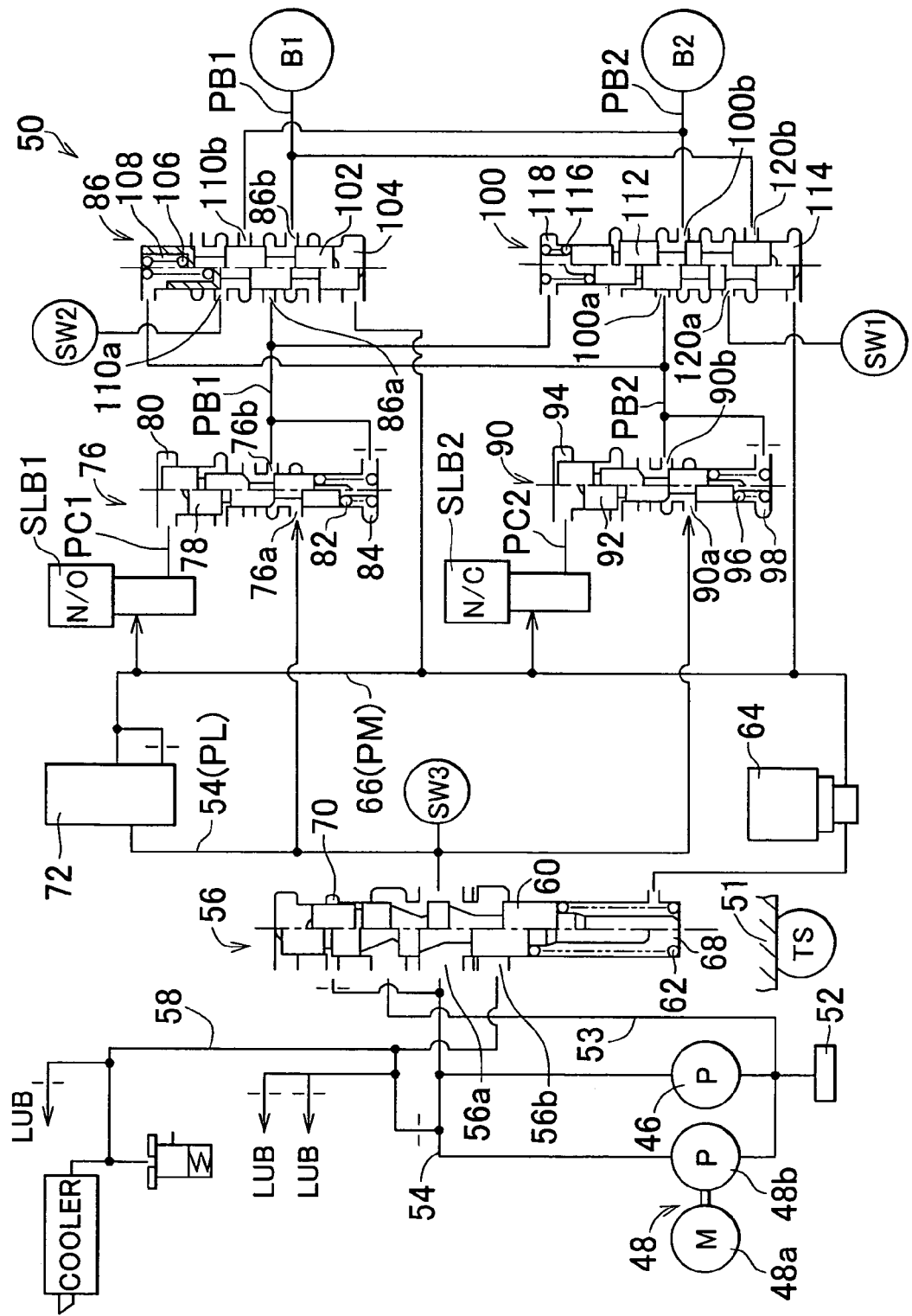
FIG. 4 is a hydraulic circuit diagram illustrating portions of a hydraulic control circuit that performs a shift control of the automatic transmission shown in FIG. 1.

FIG. 4 shows a shift-purpose hydraulic control circuit 50 for automatically controlling the shifting of the automatic transmission 22 by engaging and releasing the brakes B1, B2.

The hydraulic control circuit 50 includes, as oil pressure sources, a mechanical oil pump 46 that is operatively linked to the crankshaft 36 of the engine 24 and therefore is rotationally driven by the engine 24, and an electric oil pump 48 that includes an electric motor 48a and a pump 48b that is rotationally driven by the electric motor 48a. The mechanical oil pump 46 and the electric oil pump 48 suck the working oil that is refluxed to an oil pan (not shown), via a strainer 52, or suck the working oil that is directly refluxed via a reflux oil passageway 53, and pumps the working oil to a line pressure oil passageway 54. An oil temperature sensor TS for detecting the oil temperature $T_{OIL}$ of the refluxed working oil is provided on a valve body 51 in which the hydraulic control circuit 50 is formed, but may also be provided at a different site.

A line pressure regulating valve 56 is a relief-type pressure regulating valve, and includes a spool valve element 60 that opens and closes between a supply port 56a connected to the line pressure oil passageway 54 and a discharge port 56b connected to a drain oil passageway 58, a control oil chamber 68 which houses a spring 62 that generates thrust in the closing direction of the spool valve element 60 and which receives a module pressure PM in a module pressure oil passageway 66 via an electromagnetic open-close valve 64 when the set pressure of the line pressure PL is altered to a higher level, and a feedback oil chamber 70 connected to the line pressure oil passageway 54 which generates thrust in the opening direction of the spool valve element 60. The line pressure regulating valve 56 outputs a constant line pressure PL that is one of a low pressure and a high pressure. The line pressure oil passageway 54 is provided with a hydraulic switch SW3 that operates to an on-state when the line pressure PL is the high pressure-side value, and that operates to an off-state when it is the low pressure-side value.

A module pressure regulating valve 72 outputs to a module pressure oil passageway 66 a constant module pressure PM that is set lower than the low pressure-side line pressure PL, using the line pressure PL as an original pressure, regardless of fluctuations of the line pressure PL. A first linear solenoid valve SLB1 for controlling the first brake B1 and a second linear solenoid valve SLB2 for controlling the second brake B2, using the module pressure PM as an original pressure, output control pressures PC1 and PC2 in accordance with drive currents ISOL1 and ISOL2 that are command values from the electronic control device 44.

Figure 5:
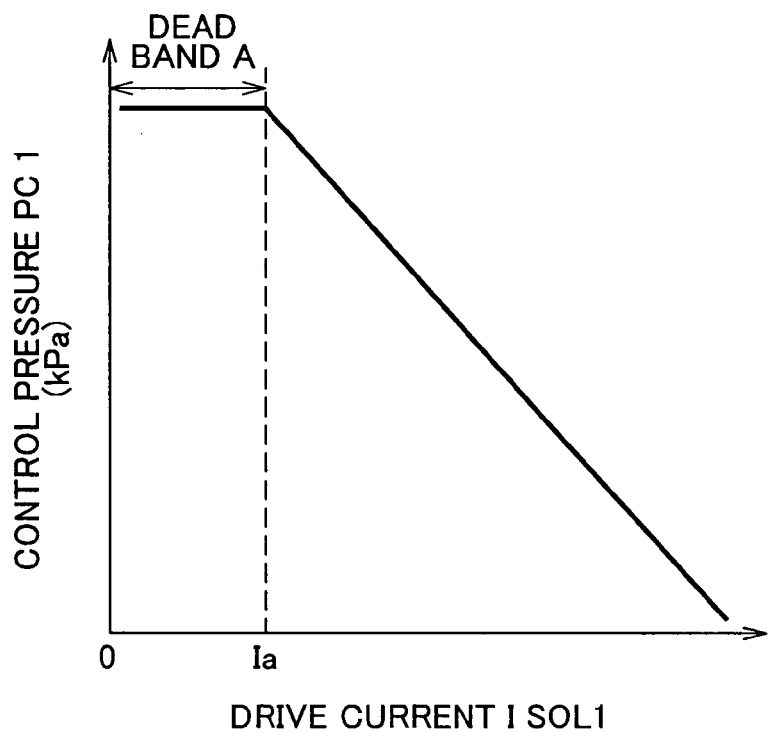
FIG. 5 is a diagram illustrating an oil pressure characteristic of a first linear solenoid valve shown in FIG. 4.
Figure 6:
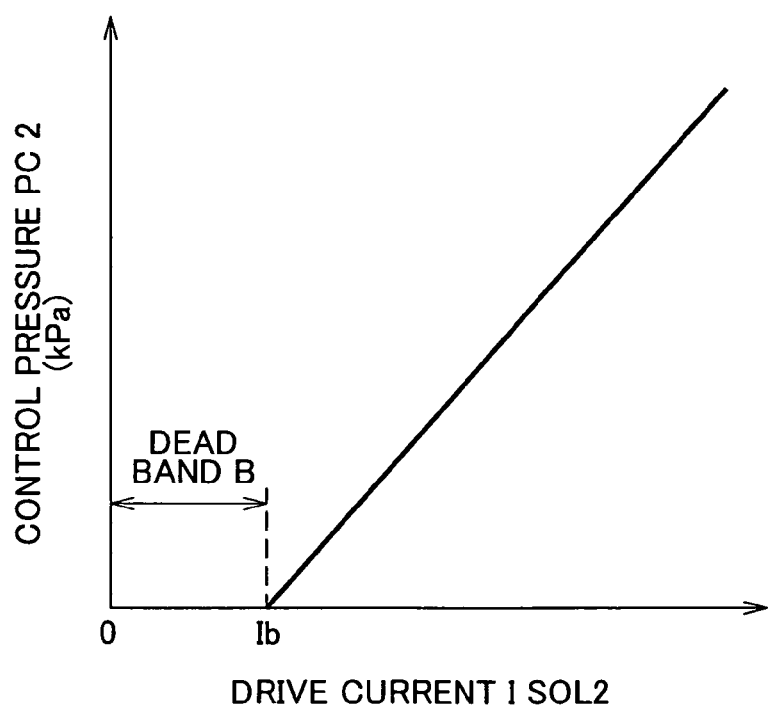
FIG. 6 is a diagram illustrating an oil pressure characteristic of a second linear solenoid valve shown in FIG. 4.

The first linear solenoid valve SLB1 has a normally open-type (N/O) valve characteristic of establishing an open valve (communicated) state between the input port and the output port during the non-electrified state. As shown in FIG. 5, as the drive current ISOL1 increases, the output control pressure PC1 is dropped. As shown in FIG. 5, the valve characteristic of the first linear solenoid valve SLB1 is provided with a dead band A in which the output control pressure PC1 does not drop until the drive current ISOL1 exceeds a predetermined value Ia. The second linear solenoid valve SLB2 has a normally closed-type (N/C) valve characteristic of establishing a closed (shut-off) state between the input port and the output port during the non-electrified state. As shown in FIG. 6, as the drive current ISOL2 increases, the output control pressure PC2 is increased. As shown in FIG. 6, the valve characteristic of the second linear solenoid valve SLB2 is provided with a dead band B in which the output control pressure PC2 does not increase until the drive current ISOL2 exceeds a predetermined value Ib.

A B1 control valve 76 includes a spool valve element 78 that opens and closes between an input port 76a connected to the line pressure oil passageway 54 and an output port 76b that outputs a B1 engagement oil pressure PB1, a control oil chamber 80 that receives the control pressure PC1 from the first linear solenoid valve SLB1 in order to urge the spool valve element 78 in the opening direction, and a feedback oil chamber 84 which houses a spring 82 that urges the spool valve element 78 in the closing direction and which receives the B1 engagement oil pressure PB1 that is the output pressure. The B1 control valve 76, using the line pressure PL in the line pressure oil passageway 54 as an original pressure, outputs the B1 engagement oil pressure PB1 whose magnitude is in accordance with the control pressure PC1 from the first linear solenoid valve SLB1, and supplies it to the brake B1 through a B1 apply control valve 86 that functions as an interlock valve.

A B2 control valve 90 includes a spool valve element 92 that opens and closes between an input port 90a connected to the line pressure oil passageway 54 and an output port 90b that outputs a B2 engagement oil pressure PB2, a control oil chamber 94 that receives the control pressure PC2 from the second linear solenoid valve SLB2 in order to urge the spool valve element 92 in the opening direction, and a feedback oil chamber 98 which houses a spring 96 that urges the spool valve element 92 in the closing direction and which receives the B2 engagement oil pressure PB2 that is the output pressure. The B2 control valve 90, using the line pressure PL in the line pressure oil passageway 54 as an original pressure, outputs the B2 engagement oil pressure PB2 whose magnitude is in accordance with the control pressure PC2 from the second linear solenoid valve SLB2, and supplies it to the brake B2 through a B2 apply control valve 100 that functions as an interlock valve.

The B1 apply control valve 86 includes a spool valve element 102 which opens and closes an input port 86a that receives the B1 engagement oil pressure PB1 output from the B1 control valve 76 and an output port 86b connected to the first brake B1, an oil chamber 104 that receives the module pressure PM in order to urge the spool valve element 102 in the opening direction, and an oil chamber 108 which houses a spring 106 that urges the spool valve element 102 in the closing direction and which receives the B2 engagement oil pressure PB2 output from the B2 control valve 90. The B1 apply control valve 86 is held in the open valve state until it is supplied with the B2 engagement oil pressure PB2 for engaging the second brake B2. When the B2 engagement oil pressure PB2 is supplied, the B1 apply control valve 86 is switched to the closed valve state, so that the engagement of the first brake B1 is prevented.

The B1 apply control valve 86 is provided with a pair of ports 110a and 110b that are closed when the spool valve element 102 is in the open valve position (position as indicated on the right side of a center line shown in FIG. 4), and that are opened when the spool valve element 102 is in the valve closed position (position as indicated on the left side of the center line shown in FIG. 4). The hydraulic switch SW2 for detecting the B2 engagement oil pressure PB2 is connected to the port 110a, and the second brake B2 is directly connected to the other port 110b. The hydraulic switch SW2 assumes an on-state when the B2 engagement oil pressure PB2 becomes a high-pressure state that is set beforehand, and is switched to an off-state when the B2 engagement oil pressure PB2 reaches or goes below a low-pressure state that is set beforehand. Since the hydraulic switch SW2 is connected to the second brake B2 via the B1 apply control valve 86, it is possible to determine the presence/absence of an abnormality of the first linear solenoid valve SLB1, the B1 control valve 76, the B1 apply control valve 86, etc., that constitute the hydraulic system of the first brake B1, as well as the presence/ absence of abnormality of the B2 engagement oil pressure PB2.

The B2 apply control valve 100, similar to the B1 apply control valve 86, includes a spool valve element 112 that opens and closes between an input port 100a that receives the B2 engagement oil pressure PB2 output from the B2 control valve 90 and an output port 100b connected to the second brake B2, an oil chamber 114 that receives the module pressure PM in order to urge the spool valve element 112 in the opening direction, and an oil chamber 118 which houses a spring 116 that urges the spool valve element 112 in the closing direction and which receives the B1 engagement oil pressure PB1 output from the B1 control valve 76. The B2 apply control valve 100 is held in the open valve state until it is supplied with the B1 engagement oil pressure PB1 for engaging the first brake B1. When the B1 engagement oil pressure PB1 is supplied, the B2 apply control valve 100 is switched to the closed valve state, so that the engagement of the second brake B2 is prevented.

The B2 apply control valve 100 is also provided with a pair of parts 120a and 120b that are closed when the spool valve element 112 is in the open valve position (position as indicated on the right side of a center line shown in FIG. 4), and that are opened when the spool valve element 112 is in the valve closed position (position as indicated on the left side of the center line shown in FIG. 4). The hydraulic switch SW1 for detecting the B1 engagement oil pressure PB1 is connected to the port 120a, and the first brake B1 is directly connected to the other port 120b. The hydraulic switch SW1 assumes an on-state when the B1 engagement oil pressure PB1 becomes a high-pressure state that is set beforehand, and is switched to an off-state when the B1 engagement oil pressure PB1 reaches or goes below a low-pressure state that is set beforehand. Since the hydraulic switch SW1 is connected to the first brake B1 via the B2 apply control valve 100, it is possible to determine the presence/absence of an abnormality of the second linear solenoid valve SLB2, the B2 control valve 90, the B2 apply control valve 100, etc., that constitute the hydraulic system of the second brake B2, as well as the presence/absence of abnormality of the B1 engagement oil pressure PB1.

FIG. 7 is a table illustrating operations of the hydraulic control circuit 50 constructed as described above. In FIG. 7, symbol "∘" shows the excited state or the engaged state, and symbol "x" shows the non-excited state or the released state. That is, by putting both the first linear solenoid valve SLB1 and the second linear solenoid valve SLB2 into the excited state, the first brake B1 is put into the released state and the second brake B2 is put into the engaged state, so that the low speed step L of the automatic transmission 22 is achieved. By putting both the first linear solenoid valve SLB1 and the second linear solenoid valve SLB2 into the non-excited state, the first brake B1 is put into the engaged state and the second brake B2 is put into the released state, so that the high speed step H of the automatic transmission 22 is achieved.

FIG. 8 is a functional block diagram illustrating portions of control functions of the electronic control devices 28, 34 and 44. In FIG. 8, when the ignition switch (power switch) is operated to the on-state, the system of a hybrid control device 130 is activated so as to enable the vehicle to run. On the basis of the accelerator operation amount θacc, the hybrid control device 130 calculates the driver's requested output, and causes the engine 24 and/or the second motor-generator MG2 to generate the requested output so as to bring about an operation with good fuel economy and low emission gas amount. For example, the engine 24 is operated on an optimal fuel economy curve to generate drive force, and the run mode is switched in accordance with the state of run of the vehicle, among an assist run mode in which the shortfall from the requested output is offset by the second motor-generator MG2, a motor run mode in which the engine 24 is stopped and the second motor-generator MG2 is exclusively used as a drive source, a run-while-charge mode in which the vehicle is run by using the second motor-generator MG2 as a drive source while using the power of the engine 24 to generate electricity via the first motor-generator MG1, an engine run mode in which the vehicle is run by mechanically transmitting the power of the engine 24 to the driving wheels 18.

The hybrid control device 130 controls the rotation speed NE of the engine 24 via the first motor-generator MG1 so that the engine 24 operates on an optimal fuel economy curve. Besides, in the case where the second motor-generator MG2 is driven for the torque assist, the hybrid control device 130 sets the automatic transmission 22 to the low speed step L to increase the torque applied to the output shaft 14 during a state of low vehicle speed V. During a state of increased vehicle speed V, the hybrid control device 130 sets the automatic transmission 22 to the high speed step H to relatively drop the rotation speed NMG2 of the second motor-generator MG2 and therefore reduce the loss. Thus, the torque assist with good efficiency is executed. Furthermore, during the coasting run, the inertia energy that the vehicle has is used to rotationally drive the first motor-generator MG1 or the second motor-generator MG2, so that the energy is regenerated as electric power that is stored into the electricity storage device 32.

Incidentally, the reverse run of the vehicle is achieved by rotationally driving the second motor-generator MG2 in the reverse direction during a state where the automatic transmission 22 is set at the low speed step L. At this time, the first motor-generator MG1 of the first drive source 12 is set at zero load or minimum torque to allow the output shaft 14 to reversely rotate irrespective of the state of operation of the engine 24.

Figure 9:
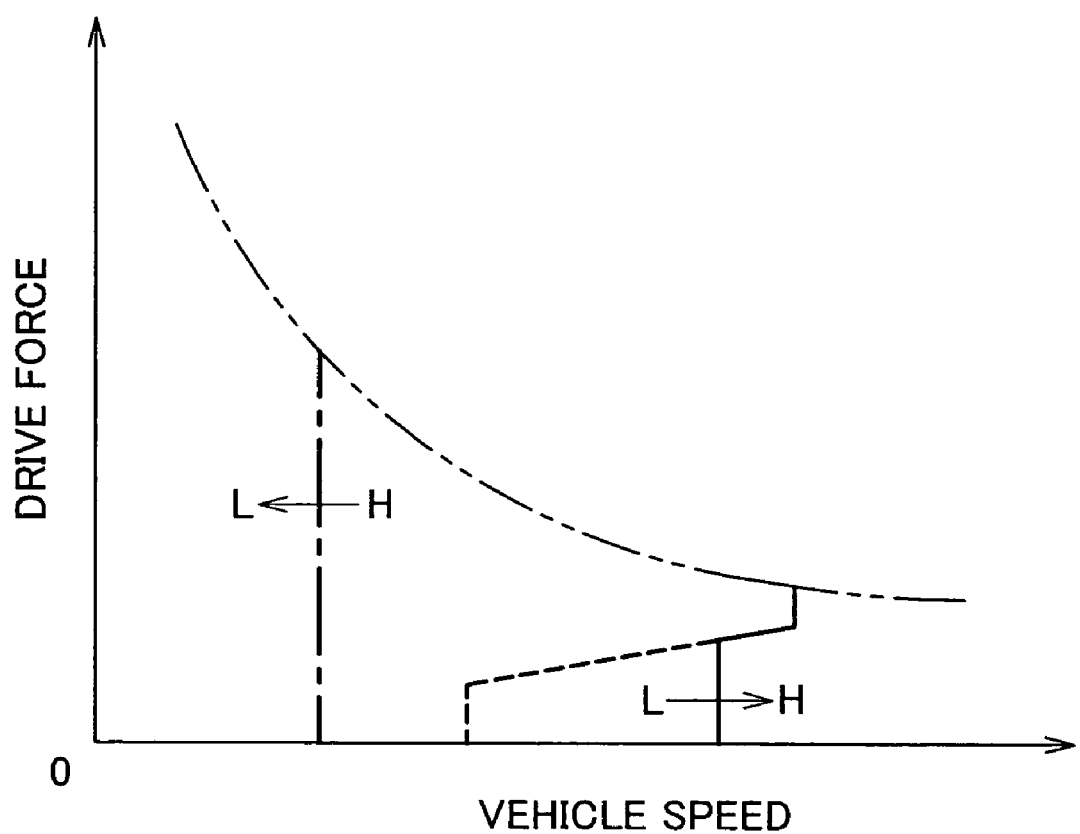
FIG. 9 is a diagram showing an example of a shift chart (map) that is used in the shift control of the automatic transmission performed by a shift control device shown in FIG. 8.

A shift control device 132 determines a speed change step of the automatic transmission 22 on the basis of the vehicle speed V and the drive force (requested output) from a pre-stored shift chart (shift map), for example, as shown in FIG. 9, and controls the first brake B1 and the second brake B2 so as to switch to the determined speed change step. A solid line in FIG. 9 is an upshift line for the switch from the low speed step L to the high speed step H, and a one-dot chain line is a downshift line for the switch from the high speed step H to the low speed step L. As shown in FIG. 9, a predetermined hysteresis is provided. The shift lines shown by the solid line and the one-dot chain line correspond to an ordinary shift rule, and ordinarily the shift is performed in accordance with these shift lines. In the first embodiment, however, besides these shift lines, an upshift line shown by a dashed line is pre-set as an air discharge-purpose shift rule. Specifically, as for the ordinary upshift line (solid line), the switch to the high speed step H is performed at high vehicle speed of, for example, about 80 to 90 km/h. On the other hand, the upshift line (dashed line) at the time of air discharge operation is designed so that at low drive force, the switch to the high speed step H is performed at intermediate vehicle speed of, for example, about 40 to 50 km/h. At a high drive force side where the accelerator operation amount θacc is relatively large, however, the air discharge-purpose upshift line causes the upshift on the same condition as the ordinary upshift line. That is, the air discharge-purpose upshift line is moved toward the low vehicle speed side only at the time of high-speed steady run with low drive force. In addition, the downshift line remains the same at the time of ordinary operation and the time of air discharge.

In the case where the calculated driver's requested output is greater than a pre-set output criterion value, or in the case where the automatic transmission 22 is performing a shift, that is, is in a shift transition state, or the like, a line pressure control device 134 switches the set pressure of the line pressure PL from a low pressure state to a high pressure state by switching the electromagnetic open-close valve 64 from the closed state to the open state to supply the module pressure PM into the oil chamber 68 of the line pressure regulating valve 56 and to therefore increase the thrust on the spool valve element 60 in the closing direction by a predetermined value.

In the first embodiment, as is apparent from shift chart of FIG. 9, since the ordinary upshift line shown by the solid line is at high vehicle speed of about 80 to 90 km/h, only the low speed step L is used and therefore the first brake B1 remains released when the vehicle runs on an ordinary road. When the vehicle runs with the first brake B1 released, air intrudes into the hydraulic circuit due to agitation of the working oil caused by vibrations of the vehicle and the like. Therefore, if the traveling time with the first brake B1 being in the released state becomes long, the accumulation of air changes the oil pressure change characteristic (response or the like) at the time of engagement so that the shift controllability at the time of the upshift, involving the engagement of the friction engagement device, deteriorates and therefore a shift shock (a drive force change or the like due to racing, tied-up, etc.) may possibly occur.

Figure 10:
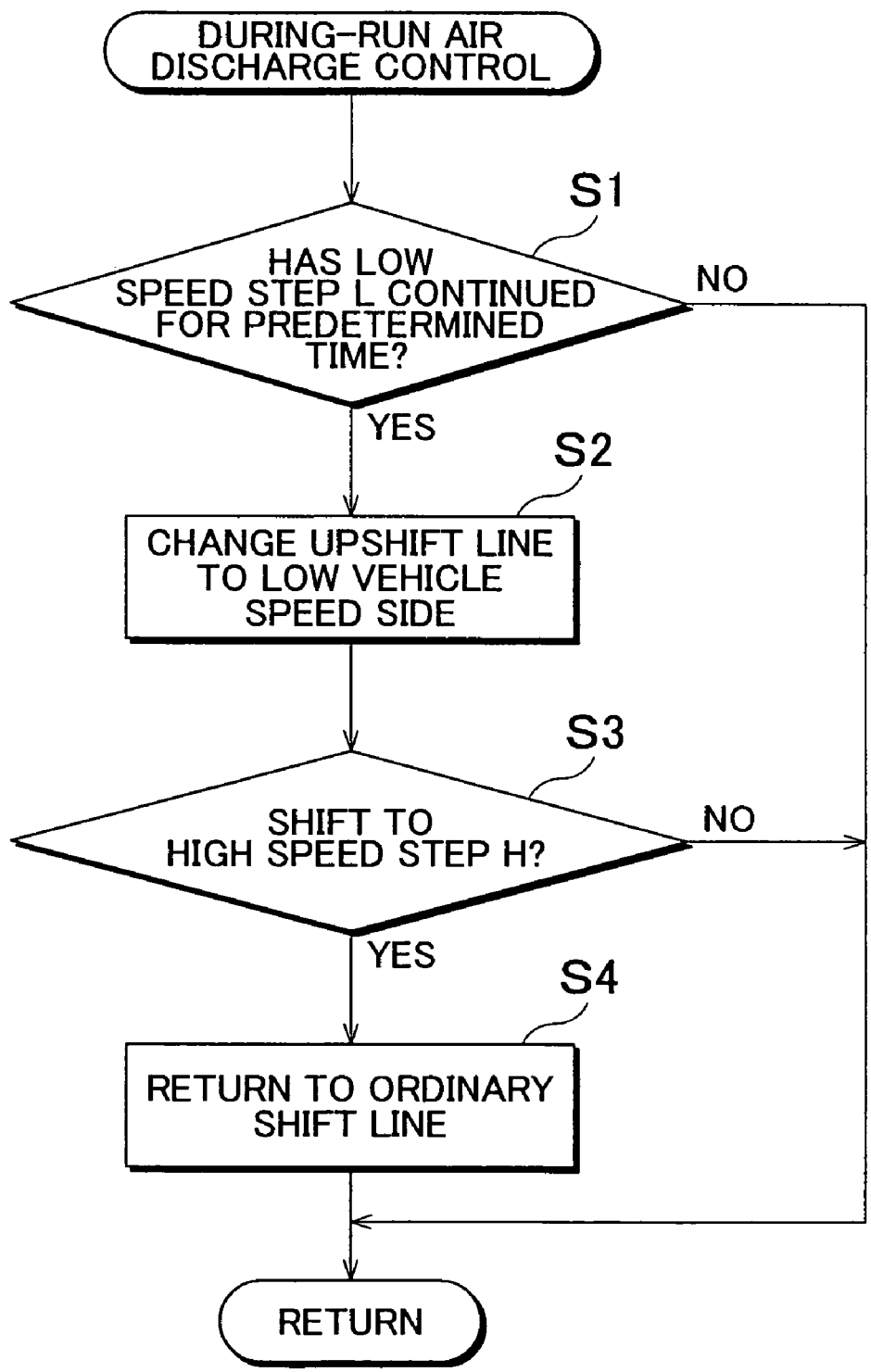
FIG. 10 is a flowchart concretely illustrating an air discharging process performed by a shift line change-to-low vehicle speed side device and the like shown in FIG. 8.

To overcome this drawback, in the first embodiment, when the continuation time of the low speed step L becomes equal to or greater than a predetermined value, the upshift line is changed to the air discharge-purpose upshift line shown by the dashed line in FIG. 9 to allow the shift to the high speed step H to be performed even when the vehicle is running on an ordinary road. Therefore, by engaging the first brake B1 by supplying the oil pressure thereto, air is discharged from the hydraulic circuit (air bleeding). Specifically, the shift-controlling the electronic control device 44 includes a low speed step continuation determination device 140, a shift line change-to-low vehicle speed side device 142, a shift-to-high speed step determination device 144, and a shift line return device 146 in connection with the shift control, and discharges air from the hydraulic circuit of the first brake B1 by changing the shift line in accordance with the flowchart shown in FIG. 10. In FIG. 10, step S1 corresponds to the low speed step continuation determination device 140, and step S2 corresponds to the shift line change-to-low vehicle speed side device 142, and step S3 corresponds to the shift-to-high speed step determination device 144, and step S4 corresponds to the shift line return device 146.

In the first embodiment, the low speed step continuation determination device 140 corresponds to an air discharge execution permission device, and the shift line change-to-low vehicle speed side device 142 corresponds to a shift rule change device. Furthermore, the first brake B1 is the first friction engagement device, and corresponds to a predetermined friction engagement device, and the second brake B2 is the second friction engagement device. Still further, the high speed step H is the first speed change step, and the low speed step L is the second speed change step.

In step S1 in FIG. 10, the continuation time during which the automatic transmission 22 is held at the low speed step L without being switched to the high speed step H is measured by, for example, adding the counter value in every control cycle or the like, and if the continuation time becomes equal to or greater than a predetermined value, step S2 and subsequent steps will be executed. The continuation time is stored in a storage device, such as an SRAM, an EEPROM, etc., that is re-writable and is able to retain the stored content even when the power is off. In the case where the operation of ending the driving of the vehicle (the turning-off operation of the ignition switch) is performed and then the driving of the vehicle is started again, the previous continuation time stored is carried on to measure the continuation time. Besides, the amount of air intrusion increases as the aforementioned continuation time lengthens, but the change of the upshift line to the air discharge-purpose upshift line results in deterioration in the vehicle running performance and the fuel economy. Therefore, it is desirable that the upshift line be changed immediately before the air intrusion amount reaches such a level that the shift controllability at the time of shift accomplished by engaging the first brake B1 becomes a problem. Hence, the aforementioned predetermined value is set at a continuation time that immediately precedes the time when the air intrusion amount that impairs the shift controllability is reached. This makes it possible to prevent the deterioration of the shift controllability by the air intrusion and, at the same time, limit the change of the upshift line for the discharge of air to a required minimum frequency, and thus curb the deterioration in the vehicle's running performance and the fuel economy associated with the change of the upshift line to a minimum level. Although the aforementioned predetermined value can be found through experiments, simulations, etc., the air intrusion amount is set at a constant value (e.g., about 2 to 3 hours) by multiplying a predetermined safety coefficient since the air intrusion amount changes depending on the individual differences of the working fluid, the state of operation of the vehicle, etc. It is to be noted herein that the aforementioned predetermined value does not altogether need to be limited to a fixed value. For example, the predetermined value may be set by using as a parameter the temperature of the working oil or the air pressure that affects the air intrusion.

Then, when the continuation time of the low speed step L becomes greater than or equal to the predetermined value, step S2 is executed in which the upshift line is changed to the air discharge-purpose upshift line shown by the dashed line in FIG. 9. This causes the shift control device 132 to perform the shift control in accordance with the air discharge-purpose upshift line, so that the shift to the high speed step H is performed even when the vehicle is running on an ordinary road. Since the high speed step H is established by releasing the second brake B2 and engaging the first brake B1, oil pressure is supplied to engage the first brake B1. Therefore, as the oil pressure in the hydraulic circuit thereof is raised, the air that has intruded in the working oil in the hydraulic circuit is discharged.

Subsequently in step S3, it is judged whether or not the shift to the high speed step H has been actually accomplished. If the shift to the high speed step H has been confirmed, the upshift line is immediately returned to the ordinary upshift line (solid line in FIG. 9) in step S4. The judgment as to whether the shift to the high speed step H has been accomplished can be performed in substantially the same manner as in the ordinary shift end determination. For example, the judgment can be performed on the basis of whether or not the input shaft rotation speed, that is, the rotation speed NMG2 of the second motor-generator MG2, has been held in the vicinity of the synchronous rotation speed of the high speed step H (the output shaft rotation speed $N_{OUT} \times$ the speed change ratio γsh of the high speed step H) for a predetermined time or longer. Then, as the shift to the high speed step H actually ends, the bleeding of air from the hydraulic circuit of the first brake B1 ends. Since the shift control based on the air discharge-purpose upshift line (dashed line in FIG. 9) deteriorates the vehicle running performance and the fuel economy, such deterioration in the vehicle running performance and the fuel economy is limited to a minimum by immediately returning to the ordinary upshift line (solid line in FIG. 9) in step S4.

Thus, in the control device of the vehicular automatic transmission of the first embodiment, the upshift line is changed to the air discharge-purpose upshift line shown by the dashed line in FIG. 9 in step S2, so that the probability of switching to the high speed step H on an ordinary road becomes higher. When the judgment for the switch to the high speed step H is made, oil pressure is supplied to engage the first brake B1, so that the air in the hydraulic circuit of the first brake B1 is discharged. Due to this, when the switch to the high speed step H is performed afterward in accordance with the ordinary upshift line (solid line in FIG. 9) during a run on an expressway or the like, that is, when oil pressure is supplied to the first brake B1 to engage it, there is no risk of impairment of the shift controllability being caused by intrusion of air.

Furthermore, since the air discharge from the first brake B1 is performed by increasing the likelihood of the switch to the high speed step H by changing the upshift line to the air discharge-purpose upshift line, the air discharge will be performed during the shift action while the vehicle is in an ordinary running state. Therefore, there is no risk of impairment of the response to a vehicle-driving operation or occurrence of drag in the brake B1 or B2 due to the power transmission occurring prior to the complete end of the shift, unlike, for example, the case where the air discharging process of the first brake B1 is performed immediately following the N→D shift switch during an initial period of the vehicle driving operation. Specifically, since at the time of launching the vehicle, the low speed step L needs to be established and therefore the first brake B1 needs to be released the second brake B2 needs to be engaged, the response deteriorates as compared with the case where the low speed step L has been established from the beginning; furthermore, if the power transmission is performed before the first brake B1 is completely released or before the second brake B2 is completely engaged, there is possibility of drag occurring in the brake B1 or B2 and therefore damaging the friction member.

Furthermore, in the first embodiment, the ordinary upshift line (solid line in FIG. 9) and the air discharge-purpose upshift line (dashed line in FIG. 9) are separately determined using the same state of run of the vehicle (the vehicle speed and the drive force), and the changing of the shift line in step S2 is practically all that needs to be performed. Therefore, large change in design is not needed, and the first embodiment can easily be applied at low cost to the related-art control device of the vehicular automatic transmission.

Furthermore, in the first embodiment, if the continuation time during which the automatic transmission 22 is held at the low speed step L without being switched to the high speed step H becomes greater than or equal to the predetermined value, the upshift line is changed to the air discharge-purpose upshift line (dashed line in FIG. 9). Therefore, the change of the upshift line is limited to a required minimum frequency, and the deterioration in the running performance and the fuel economy associated with the change of the upshift line is curbed to a minimum Specifically, the aforementioned continuation time substantially coincides with the traveling time of the vehicle during which the first brake B1 is held in the released state, and the amount of air intrusion in the hydraulic circuit of the first brake B1 increases as the continuation time lengthens. Therefore, by setting the aforementioned predetermined value so that the upshift line is changed immediately before the amount of air intrusion increases to such a level that the shift controllability at the time of shift performed by engaging the first brake B1 becomes problematic, the change of the upshift line can be limited to a required minimum frequency.

In the first embodiment, in the case where the operation of ending the driving of the vehicle is performed and then the driving is started again, the previous continuation time is carried on to measure the continuation time. Therefore, the deterioration of the shift controllability by the air intrusion is prevented and, at the same time, the change of the upshift line for the discharge of air is limited to a required minimum frequency, and thus the deterioration of the vehicle's running performance and the fuel economy associated with the change of the upshift line is curbed to a minimum level.

Furthermore, in the first embodiment, if the upshift line is changed to the air discharge-purpose upshift line in step S2 and the shift to the high speed step H is actually performed with the first brake B1 engaged in accordance with the air discharge-purpose upshift line, the result of the judgment of step S3 is YES (affirmative), and is followed by the execution of step S4, in which the return to the ordinary upshift line (solid line in FIG. 9) is immediately performed. Therefore, the deterioration of the vehicle's running performance and the fuel economy associated with the change of the upshift line is curbed to a minimum.

Next, a second embodiment will be described. In the second embodiment, the control device of the vehicular automatic transmission is applied to a hybrid drive device 10 as in the first embodiment. The second embodiment is different from the first embodiment merely in the fashion of performing the air discharging process of the first brake B1. Only the different portions will be described below.

Figure 11:
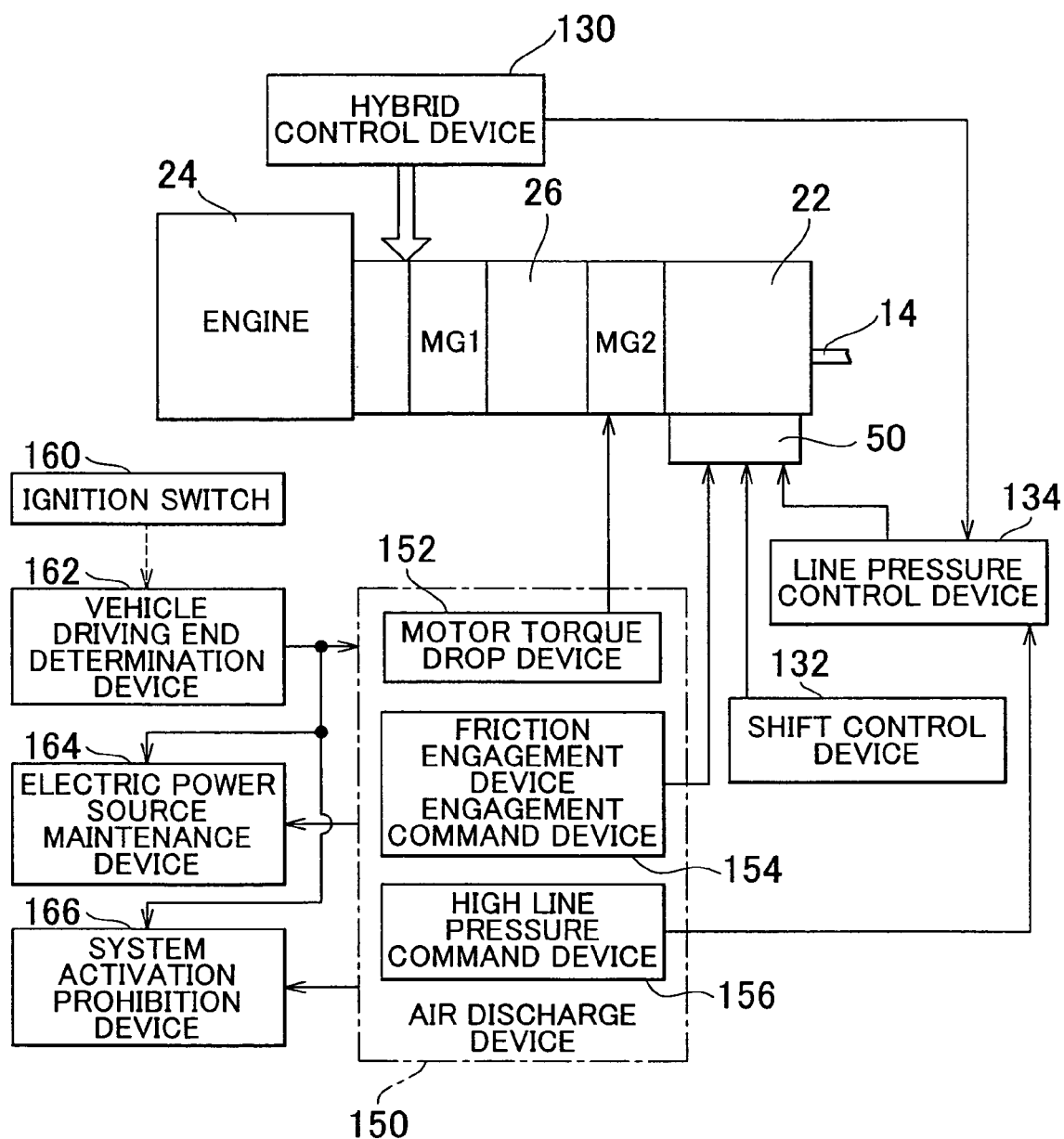
FIG. 11 is a diagram illustrating a control device of the second embodiment, and is a functional block diagram corresponding to FIG. 8 based on the first embodiment.
Figure 12:
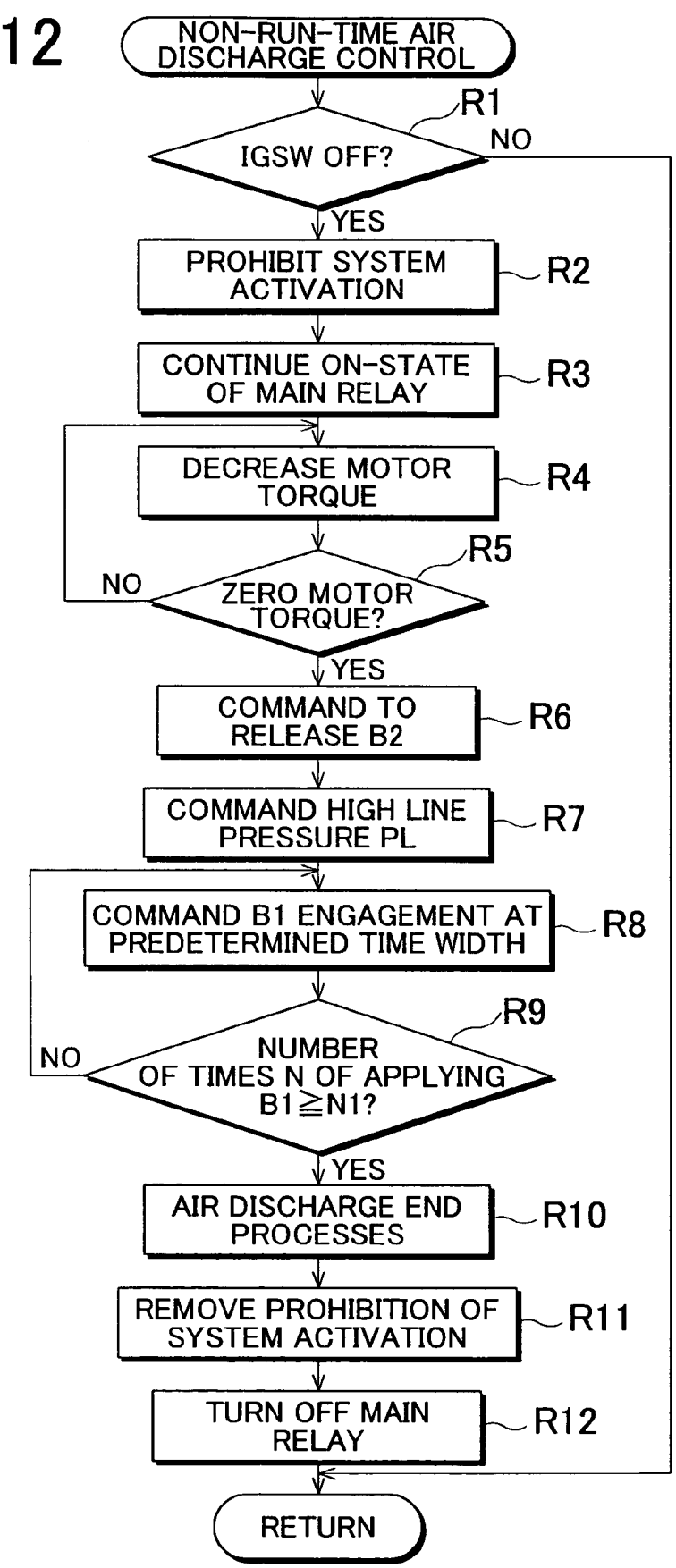
FIG. 12 is a flowchart concretely illustrating an air discharging process performed by an air discharge device and the like shown in FIG. 11.
Figure 13:
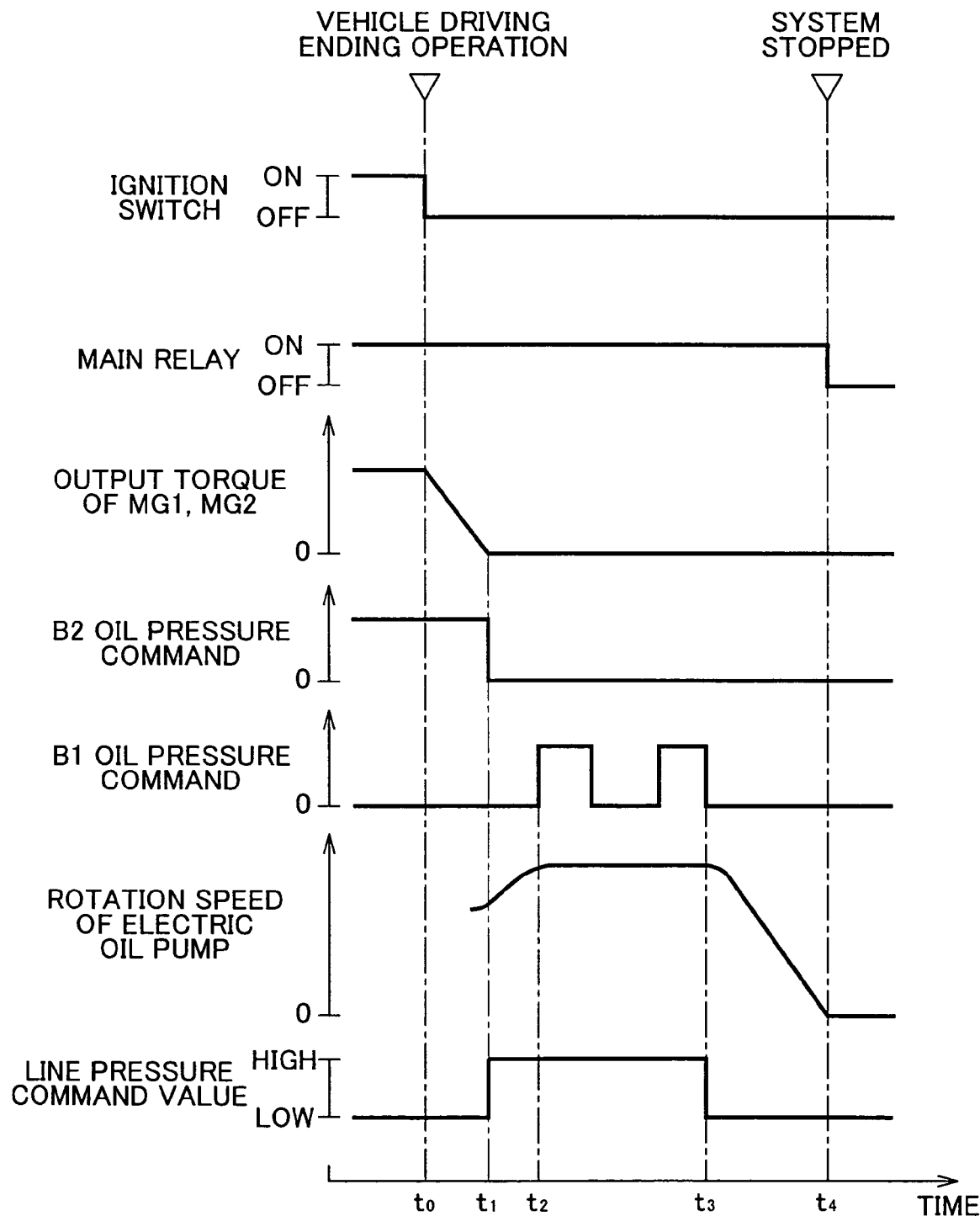
FIG. 13 is a diagram showing an example of a time chart in the case where the air discharging process is performed in accordance with the flowchart of FIG. 12.

FIG. 11 is a diagram corresponding to FIG. 8. In FIG. 11, the electronic control devices 28, 34, 44 functionally include an air discharge device 150, a vehicle driving end determination device 162, an electric power source maintenance device 164, and a system activation prohibition device 166. The air discharge device 150 includes a motor torque drop device 152, a friction engagement device engagement command device 154, and a high line pressure command device 156, and performs the air discharging process of the first brake B1 after the end of the driving of the vehicle in accordance with a flowchart of FIG. 12. In FIG. 12 step R1 corresponds to the vehicle driving end determination device 162, and steps R2 and R11 correspond to the system activation prohibition device 166, and steps R3 and R12 correspond to the electric power source maintenance device 164, and step R4 corresponds to the motor torque drop device 152, and step R7 corresponds to the high line pressure command device 156, and steps R8 and R9 correspond to the friction engagement device engagement command device 154. FIG. 13 is an example of a time chart showing the state of operation of various portions in the case where the air discharging process is performed in accordance with the flowchart of FIG. 12.

In step R1 in FIG. 12, it is judged whether or not an ignition switch 160 (see FIG. 11) as a main switch for turning on (activating) and off (stopping) a control system of the vehicle has been turned off, that is, whether or not an ending operation, that is, a final operation performed to end the driving of the vehicle, has been performed. In the case where the ignition switch 160 has been turned off, step R2 and subsequent steps are executed. In FIG. 13, time to is the time at which the vehicle driving end determination that makes a judgment of YES in step R1 is made.

In step R2, even if the ignition switch 160 is turned on, the activation of the control system is prohibited by canceling the on signal of the ignition switch 160. In this manner, the performance of an activating process, such as a startup of the engine 24 or the like, is prevented. In step R3, the on-state (connected state) of a main relay is continued in order to allow the supply of electric power from a battery (of low voltage of, for example, 12V) despite the vehicle driving ending operation) and therefore make possible the actions of the electric oil pump 48, the electromagnetic open-close valve 64 of the hydraulic control circuit 50, the first linear solenoid valve SLB1, etc., which are needed in order to supply oil pressure to the first brake B1. Due to this, the action of the electric oil pump 48 is continued. Besides, in step R4, the torque of the motor-generators MG1, MG2 is gradually dropped to zero, and the reaction force of the engine 24 is canceled, and the creep torque is brought to zero. Incidentally, the engine 24 is also stopped in accordance with the ordinary ending process.

Subsequently in step R5, it is judged whether or not the torque of the motor-generators MG1, MG2 has become zero. If it is confirmed that the torque has become zero, step R6 and subsequent steps are executed. In step R6, a command to release the second brake B2 is output to the second linear solenoid valve SLB2, so that the second brake B2 is released. In step R7, a high-pressure command to change the line pressure PL to a high pressure side is output to the electromagnetic open-close valve 64. The line pressure PL is changed to the high pressure side as the module pressure PM is supplied to the line pressure regulating valve 56 via the electromagnetic open-close valve 64. In step R7, in order to promptly change the line pressure PL to high pressure, the rotation speed of the electric motor 48*a* of the electric oil pump 48 is raised. In FIG. 13, time t1 is the time at which the command to release the second brake B2 is output and the high-pressure command to change the line pressure PL to the high pressure side is output.

Subsequently in step R8, the process waits until the rotation speed of the electric oil pump 48 reaches a predetermined target value that is needed in order to change the line pressure PL to the high pressure side, and then an engagement command to engage the first brake B1 with a maximum pressure (line pressure PL) is output to the first linear solenoid valve SLB1 at a predetermined time width. The time width of the engagement command is a time that allows the first brake B1 to be completely engaged by the B1 engagement oil pressure PB1 (line pressure PL) being supplied to the first brake B1 in accordance with the control pressure PC1 output from the first linear solenoid valve SLB1. As the first brake B1 is engaged in this manner, the air that has intruded in the hydraulic circuit is discharged. In FIG. 13, time t2 is the time at which the command to engage the first brake B1 is output. After the predetermined time width elapses, the oil pressure command is brought to zero, so that the first brake B1 is released.

The foregoing engagement control of the first brake B1, that is, the air discharging process thereof, may be performed only once. However, in the second embodiment, the air discharging process is performed a plurality of times N1 (N1=2 in FIG. 13) at predetermined intervals. The interval is, for example, a time that allows the first brake B1 to be completely released. By repeating the air discharging process a plurality of times in the above-described manner, the air in the hydraulic circuit can be further thoroughly discharged. In step R9, it is judged whether or not the number of times N of applying the B1 engagement oil pressure PB1 (the number of times of outputting the engagement command) has reached the set value N1. Step R8 is repeatedly executed until the number of times N1 is reached. After the number of times N of applying the B1 engagement oil pressure PB1 reaches the number of times N1, step R10 is executed, in which a process of ending the air discharging control is performed; for example, the electric motor 48*a* of the electric oil pump 48 is stopped; the line pressure PL is switched to the low pressure side; etc. In FIG. 13, time t3 is the time at which the result of the judgment in step R9 is YES (affirmative) and the air discharge ending process of step R10 is started.

Subsequently in step R11, the prohibition of activation of the control system set in step R2 is removed to accept the turning-on operation of the ignition switch 160. In step R12, after a wait until the rotation speed of the electric oil pump 48 becomes equal to or less than a predetermined value (0 in FIG. 13), the main relay is turned off (shut off) to shut off the electric power source. Thus, the control system is completely stopped. In FIG. 13, time t4 is the time at which the main relay is turned off and the control system is stopped. The time taken from the start of the control at time t0 to the end of the control at time t4 is, for example, a few seconds (1 to 3 seconds) or so.

In the second embodiment, after the turning-off operation of the ignition switch 160, that is, the ending operation of the driving, is performed, the electric oil pump 48 is actuated to supply oil pressure to the first brake B1 and therefore engage it, whereby the air that has intruded in the hydraulic circuit of the first brake B1 is discharged. Therefore, when the first brake B1 is to be engaged at the time of the shift to the high speed step H after the driving of the vehicle is started again, there is no risk of the shift controllability being impaired by intrusion of air.

Furthermore, since the air discharging process is performed after the ending operation of the driving is performed, there is ordinarily no risk of overlap between the air discharging process and the vehicle-driving operation. Therefore, there is no risk of deterioration of the response to a driving operation, or occurrence of drag in the brake B1 or B2 due to the power transmission occurring prior to the complete end of the shift, unlike, for example, the case where the air discharging process of the first brake B1 is performed immediately following the N→D shift switch during an initial period of the vehicle-driving operation.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. In relation to an automatic transmission which has a plurality of friction engagement devices that are engaged when supplied with an oil pressure and which establishes a plurality of speed change steps in accordance with an engaged state and a released state of the plurality of friction engagement devices, a control device of a vehicular automatic transmission that switches between the speed change steps in accordance with a predetermined shift rule, comprising a controller which changes the shift rule to an air discharge-purpose shift rule that is set so as to provide a higher probability of switching to a speed change step that involves engagement of a predetermined friction engagement device of the plurality of friction engagement devices than the shift rule in order to discharge air that has intruded in a hydraulic circuit of the predetermined friction engagement device, and which causes switching between the speed change steps in accordance with the air discharge-purpose shift rule.

2. In relation to an automatic transmission which has a plurality of friction engagement devices that are engaged when supplied with an oil pressure and which establishes a first speed change step by engaging a first friction engagement device of the plurality of friction engagement devices and releasing a second friction engagement device of the plurality of friction engagement devices, and establishes a second speed change step by releasing the first friction engagement device and engaging the second friction engagement device, a control device of a vehicular automatic transmission that switches between the first speed change step and the second speed change step in accordance with a predetermined shift rule, comprising a controller which changes the shift rule to an air discharge-purpose shift rule that is set so as to provide a higher probability of switching to the first speed change step than the shift rule in order to discharge air that has intruded in a hydraulic circuit of the first friction engagement device, and which causes switching between the speed change steps in accordance with the air discharge-purpose shift rule.

3. The control device of the vehicular automatic transmission according to claim 2, wherein the shift rule and the air discharge-purpose shift rule are shift lines that are separately determined by using a same vehicle run state as a parameter, and the controller changes between the shift lines.

4. The control device of the vehicular automatic transmission according to claim 2, wherein the vehicular automatic transmission is a two-step transmission whose speed change steps are only the first speed change step and the second speed change step, and the control device determines whether or not a continuation time during which the second speed change step has been established without being switched to the first speed change step has become greater than or equal to a predetermined value, and permits the shift rule to be changed to the air discharge-purpose shift rule, if the continuation time has become greater than or equal to the predetermined value.

5. The control device of the vehicular automatic transmission according to claim 4, wherein the predetermined value is a constant value.

6. The control device of the vehicular automatic transmission according to claim 4, wherein the predetermined value is set by using at least one of an oil temperature of the automatic transmission and an atmospheric pressure as a parameter.

* * * * *